(12) United States Patent
Newell et al.

(10) Patent No.: US 7,387,388 B2
(45) Date of Patent: Jun. 17, 2008

(54) ILLUMINATION SYSTEM USING POLARIZATION CONVERSION

(75) Inventors: Michael Newell, Santa Rosa, CA (US); UnSig Min, Westlake Village, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 70 days.

(21) Appl. No.: 11/103,154

(22) Filed: Apr. 11, 2005

(65) Prior Publication Data
US 2005/0231690 A1 Oct. 20, 2005

Related U.S. Application Data

(60) Provisional application No. 60/562,370, filed on Apr. 15, 2004, provisional application No. 60/569,746, filed on May 10, 2004.

(51) Int. Cl.
*G03B 21/14* (2006.01)
*G03B 21/20* (2006.01)
*G03B 21/26* (2006.01)
*G03B 21/28* (2006.01)
*G02B 5/30* (2006.01)
*G02B 27/28* (2006.01)
*G02B 6/00* (2006.01)
*F21V 9/14* (2006.01)

(52) U.S. Cl. .................. 353/20; 353/37; 353/97; 353/99; 353/102; 359/495; 385/11; 385/133; 385/901; 362/19; 362/551

(58) Field of Classification Search .................. 353/20, 353/30, 33, 34, 37, 81, 82, 98, 99, 102; 349/5, 349/7–9, 96, 98; 359/483, 487, 495, 496; 385/11, 901; 362/19, 551
See application file for complete search history.

(56) References Cited

U.S. PATENT DOCUMENTS

| 4,045,133 | A | 8/1977 | Carlson ........................ 355/1 |
| 6,139,157 | A | 10/2000 | Okuyuma .................... 353/102 |
| 6,343,862 | B1 * | 2/2002 | Sawai et al. ................... 353/1 |
| 2003/0214617 | A1 * | 11/2003 | Bierhuizen et al. ......... 349/113 |
| 2004/0169774 | A1 * | 9/2004 | Hibi et al. .................. 348/744 |
| 2005/0052873 | A1 * | 3/2005 | Sokolov ..................... 362/341 |

FOREIGN PATENT DOCUMENTS

| WO | WO 01/81960 A | 11/2001 |
| WO | WO 02/063390 A | 8/2002 |

* cited by examiner

*Primary Examiner*—Rochelle-Ann Blackman
(74) *Attorney, Agent, or Firm*—Allen, Dyer, Doppelt, Milbrath & Gilchrist, P.A.

(57) ABSTRACT

An apparatus and method is discloses for providing a substantially uniform, homogenous, polarized light. A beam of substantially un-polarized light is provided by a conventional light source. The un-polarized light is converted to at least four real images by using a light pipe and appropriate lensing. Each of the real images have a light region and one more dark regions at a first image plane. A portion of light from a light region in each real image is directed to one or more dark regions in each of the real images in a polarization dependent manner and the altered image is into a single image of substantially polarized light.

15 Claims, 8 Drawing Sheets

ILLUMINATION SYSTEM USING POLARIZATION CONVERSION

CROSS-REFERENCE TO RELATED APPLICATIONS

The present invention claims priority from U.S. Provisional Patent Application No. 60/562,370 filed Apr. 15, 2004, entitled "Illumination System Utilizing Polarization Recovery", and U.S. Provisional Patent Application No. 60/569,746 filed May 10, 2004, entitled "Illumination System Utilizing Polarization Recovery" which are incorporated herein by reference for all purposes.

FIELD OF THE INVENTION

This invention relates to an illuminating apparatus such as is commonly used in a projection display system and more particularly to an illumination system that provides an enhanced polarized output.

BACKGROUND OF THE INVENTION

In projection display systems the function of the illumination system is to provide uniform illumination to a spatial light modulator (SLM). Typically the illumination system in a projection display consists of a light source such an arc lamp or light emitting diodes (LEDs), a homogenizer of some type for providing homogenized light at the SLM, and a relay lens for providing a beam having a desired size, shape and telecenetricity.

In some projection display systems, liquid crystal spatial light modulators are used, and it is desirable to illuminate such modulators with polarized light. A polarizer can be added to the illumination system to filter the light, so as to provide a polarized beam to the SLM, however this method has an associated loss of 50% of the light, as one polarization state is absorbed or otherwise lost. Illumination systems utilizing polarization recovery techniques seek to take this lost light and covert it to the desired polarization state so it can be recovered and utilized, thus increasing the efficiency of the system and hence the brightness of projection. Prior art methods of performing this polarization recovery and conversion include the use of lenslet arrays and a polarization conversion array (PCA) or the use of a polarization converting light pipe (PCLP).

Projection displays incorporating transmissive liquid crystal SLMs typically use a lenslet array and a PCA; some reflective liquid crystals SLMs also known as liquid crystal on silicon (LCoS) also use a lenslet array and PCA. Prior art FIG. 1 of the accompanying drawings is a schematic view of the essential portions of another liquid crystal projector disclosed in U.S. Pat. No. 6,139,157. In FIG. 1, light emitted by a lamp 201a is reflected toward an image display element 207 by a reflector 203, and enters a first lens array 201b comprising a plurality of lenses arranged into the form of a grating. The aforementioned light is condensed near the lenses of a second lens array 202 similar in construction to the first lens array 201 and comprising lenses having the same degree of focal length as the interval between the first lens array 201 and the second lens array 202 and arranged into the form of a grating by the lenses of the first lens array 201, and is caused to be transmitted through the lenses of the second lens array 202, whereafter it enters a polarization converting element 204.

The light beam which has entered the polarization converting element 204 is separated into different polarized components (S component and P component) by a polarization separating surface 204a, and S-polarized light reflected by the polarization separating surface 204a is reflected by a reflecting mirror 204b and is transmitted through a half wavelength plate 205, whereby it is converted into the same polarized state as the P-polarized light transmitted through the polarization separating surface 204a.

P-polarized light beams having the same directions of polarization which have emerged from the polarization converting element 204 illuminate the image display element 207 provided near the focus position (the surface to be irradiated) of a condensing lens 206, through the condensing lens 206. An image displayed by the image display element 207 is projected onto a predetermined surface by a projection lens.

On the other hand, the liquid crystal projector shown in FIG. 1 forms a plurality of secondary light source images by a the fly-eye type optical integrator and superposes the light beams from the plurality of secondary light source images one upon another on the surface to be irradiated to uniformly illuminate the surface 207 to be irradiated.

The liquid crystal projector of FIG. 1, however, requires first and second lens arrays of the same degree of size as an opening in the reflecting mirror 203 and therefore, the entire apparatus tends to be bulky.

There have heretofore been proposed various liquid crystal projectors for illuminating a liquid crystal panel by a light beam from a light source, and enlarging and projecting image light such as transmitted light or reflected light from the liquid crystal panel onto a screen or a wall by a projection lens.

Usually the liquid crystal panel utilizes the polarizing characteristic of liquid crystal. Therefore, usually, polarizing filters such as a polarizer and an analyzer are provided before and behind the liquid crystal panel. The polarizing filter has the characteristic of transmitting therethrough polarized light polarized in a particular direction of polarization of incident light, and intercepting polarized light of which the direction of polarization is orthogonal thereto. Therefore, the light from the light source utilized in the liquid crystal projector has had at least a half thereof intercepted by the polarizer which is a polarizing filter and thus, the brightness of the image projected onto the screen or the wall has not been sufficient.

Projection systems being manufactured incorporating LCos SLMs currently employ PCLPs in their illumination system. The most common form of PCLP includes a reflector in the form of a light pipe having two PBSs at the input end of the light pipe. Light from the light source is incident upon one PBS. The PBS spits the light into S and P polarization states. P-polarized light is transmitted and the S-polarized light is reflected. The P-polarized light is then incident upon a rotator in the form of a half-wave retarder which is oriented such that the emerging light has its polarization axis rotated by 90 degrees such that it has been converted to S-polarized light. The S-polarized light split off by the PBS is then incident upon the second PBS where it is reflected and re-directed into the light pipe. S-polarized light thus emerges from both PBSs and is then homogenized by the light pipe. The PCLP tends to be a lower cost system than the aforementioned lenslet array PCA, but suffers from lower contrast, approximately 6:1 emerging from the PCLP as compared with the 20 to 30:1 from the lenslet array PCA, and lower efficiency; about 72% compared with approximately 80%.

Prior art U.S. Pat. No. 6,139,157 incorporated herein by reference is directed to an illuminating apparatus which appears to have several elements in common with the instant invention. A light source, light pipe, lenses, a reflective polarization beam splitter, a polarization conversion element and a target plane are all shown in this patent. Notwithstanding, the invention shown in FIG. 13 of this patent, shown herein as FIG. 2, is absent an obstruction or opaque region at an input end of the light pipe. The applicant believes that by not providing a light pipe with masked region at the input end, a uniform polarized beam will not result. By providing the obstruction or masked region at an input end of the light pipe, and ensuring that the polarization translation and separation occurs at predetermined locations in dependence upon the configuration of the masked region, a desired uniform polarized beam will result. The description of FIG. 13 is as follows:

"The polarization converting element 74 shown in FIG. 13 uses a transparent plate provided with a polarization separating surface 701 on the surface thereof as reflecting means for bending the optical path by 90.degree. and a reflecting mirror 702 on the back thereof, and the optical paths of S-polarized light reflected by the surface and P-polarized light reflected by the back are deviated in parallelism to each other, and a half wavelength plate 703 is disposed on the optical path of the S-polarized light reflected by the surface (or the optical path of the P-polarized light reflected by the back) to thereby uniformize the directions of polarization of the two lights."

Also, in the system of prior art FIG. 13, half wavelength plates 703 are periodically provided on the flat surface of the plano-convex integrated lens 5 to thereby convert the direction of polarization of the incident S-polarized light into the same direction as the P-polarized light."

It is unclear whether the structure shown in FIG. 13 functions as it is intended to. Since there is no structure taught which blocks light from the input end, it would appear as if all light of one linear polarization incident upon surface 701 is reflected upon the entire receiving surface of 5. It would also appear as if all light reflected from surface 702 is reflected upon the same region of 5. Therefore it is not clear how this embodiment works to selectively rotate one linear polarization and not the other.

It is an object of this invention to provide a system and method for uniformly illuminating a spatial light modulator which incorporates a novel, relatively low cost method of polarization recovery.

It is an object of this invention to provide a simple, low cost system for providing substantially uniform polarized light for use in a projection display system.

SUMMARY OF THE INVENTION

In accordance with an aspect of this invention an illuminating system is provided comprising:
a) a light pipe having an input end for receiving substantially unpolarized light from a light source and an output end for outputting reflected light, the input end having a masked portion and an unmasked portion, the masked portion for substantially preventing light from entering the light pipe and the unmasked portion for allowing light to enter into the light pipe, wherein the light pipe is for reflecting light and for producing a plurality of virtual images, each virtual image having a dark non-illuminated region corresponding to the masked region and an illuminated region corresponding to the unmasked region adjacent to the dark region;
b) a lens optically coupled to the output end of the light pipe for providing a plurality of real images at or about an image plane, wherein each real image corresponds to one of the virtual images such that each real image has a dark non-illuminated region corresponding to the masked portion and an illuminated region corresponding to the unmasked portion, wherein the plurality of real images together form an array of dark regions and illuminated regions; and,
c) a polarization converting system optically coupled to receive light from the array of dark and light regions and for filling the dark regions with some light from the illuminated regions in a polarization dependent manner, such that some light is spatially translated from a illuminated region to a dark region, said polarization converting system for converting light so that substantially all of the light passing therethough is uniformly polarized.

At least 80% of the light that passes through the polarization converting system is uniformly polarized and preferably 90% or greater.

In accordance with the invention there is provided an illuminating system comprising:
a) a light source;
b) a light pipe having an end thereof masked in a predetermined manner so as to produce virtual images each having a dark region corresponding to the masked region and having an unmasked illuminated region adjacent the masked region;
c) a lens coupled to the light pipe for producing real images corresponding to the virtual images wherein each real image has an illuminated region and an un-illuminated region;
d) a polarization conversion system for receiving light form the lens and for filling the un-illuminated regions with light from adjacent illuminated regions in a polarization dependent manner so as to produce a polarized light beam formed from the real images.

In accordance with another aspect of the invention, there is provided, in a projection display system, a method of providing a substantially uniform, homogenous, polarized light source comprising the steps of:
providing a beam of substantially un-polarized light;
converting the un-polarized light to at least four real images each having a light region and one more dark regions at a first image plane;
directing a portion of light from a light region in each real image to one or more dark regions in each of the real images in a polarization dependent manner; and,
homogenizing the altered image into a single image of substantially polarized light.

BRIEF DESCRIPTION OF THE DRAWINGS

Exemplary embodiments of the invention will now be described in conjunction with the figures in which.

DETAILED DESCRIPTION

Figure 1:
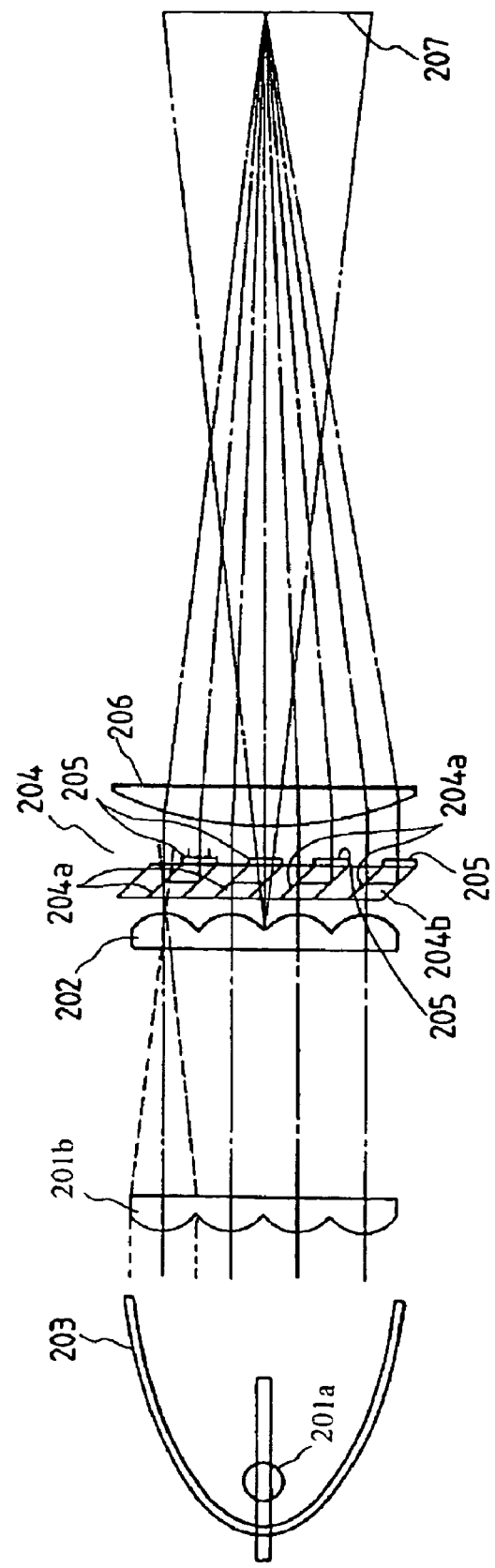
FIG. 1 is a side view of a prior art system for polarization conversion using a fly's eye array and a PCA.
Figure 2:
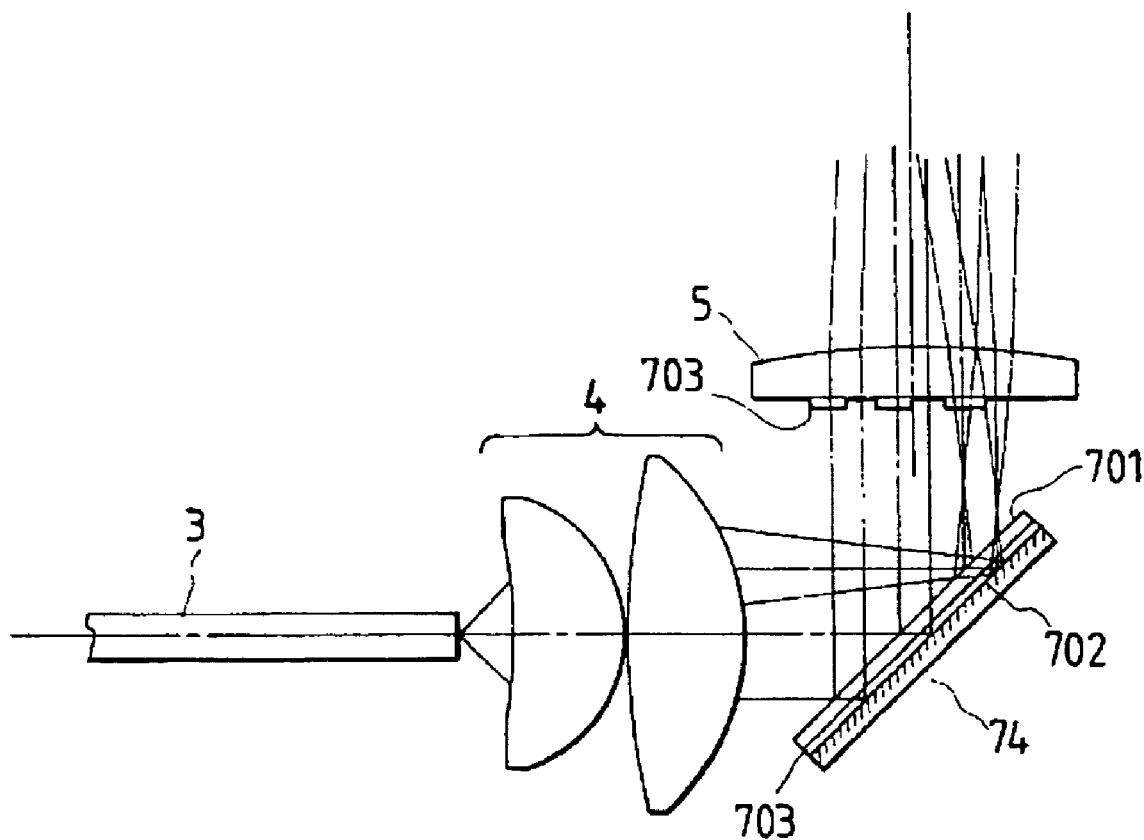
FIG. 2 is a side view of a polarization conversion system as shown in U.S. Pat. No. 6,139,157.
Figure 3:
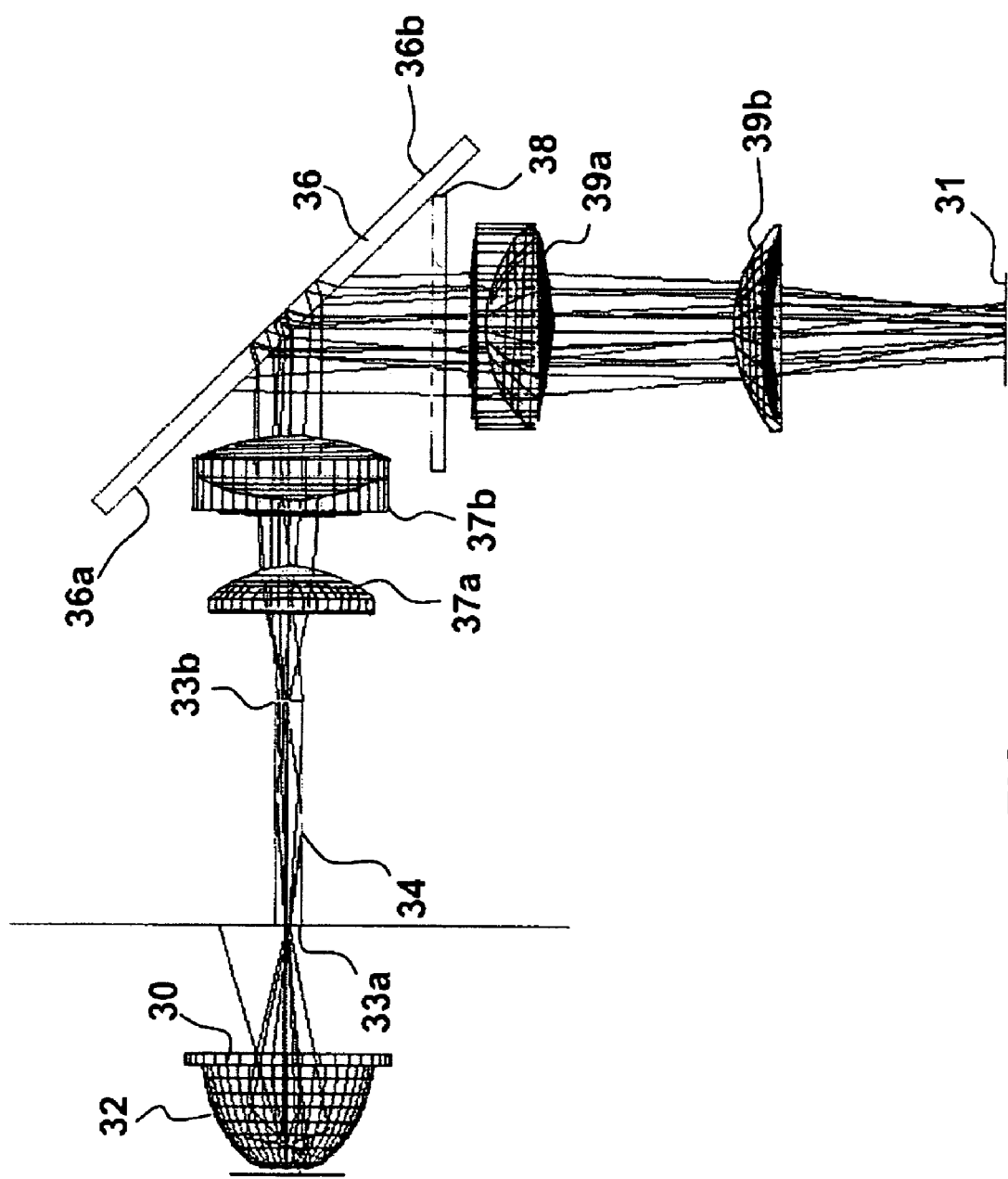
FIG. 3 is a side view of a preferred embodiment of the illumination system in accordance with this invention.

Referring now to FIG. 3 an illumination system in accordance with a preferred embodiment of this invention is shown. A light source 30 having a reflector 32 is optically coupled to a light pipe 34. The light pipe is conventional in all respects except one. The light pipe 34 has a masked region at its input end, not seen in FIG. 3 but clearly illustrated in FIG. 4a. The light pipe 34 may be a light tunnel or other light reflecting structure having an input end that can be masked and an output end for outputting light. A polarization separator and translator 36 is disposed to receive substantially collimated light from the light pipe via lenses 35a and 35b in the form of a plurality of real images. A similar element 74 is shown in detail in FIG. 2. Each real image is a reduced image of the input end of the light pipe. A more detailed description of this follows. The polarization separator and translator 36 is disposed to separate the S and P-polarized light and then spatially translate the light in a polarization dependent manner such that the S-polarized light and P-polarized light is incident upon the polarization converter (PC) plate 38 in a predetermined spatial pattern. The polarization converter 38 is a plate having striped regions 52 with a half wave retarding material present in alternating regions. Light of one linear polarization falls on the striped regions 52 while light of the other linear polarization passes through glass regions 50 unaffected as is shown in FIG. 5. Relay elements 39a and 39b ensure that the light emerging from the PC 38 is uniformly distributed over the SLM plane 31.

In operation light from the light source 30 is focused by the reflector 32 on the input end 33a of the light pipe or light tunnel 34. Light traverses the light pipe from the input end face to the output face 33b, experiencing multiple reflections from the walls of the light pipe. Total internal reflection (TIR) from the light pipe walls prevents light from escaping the light pipe. After multiple reflections within the light pipe 34 the light becomes homogenized, with the output face 33b of the light pipe representing an essentially uniformly emitting surface. A hollow tunnel made up of mirrors can also be used, and is considered to be an equivalent. The light pattern at the output end face 33b is then imaged by the illumination relays 37a, 37b, 39a and 39b on to the SLM 31. In this embodiment the polarization separator translator is disposed after the first two relay elements 37a and 37b. This region is essentially collimated space where the light exiting the relay element 37b is collimated. The function of the polarization separator translator 36 is to separate the orthogonal linear polarization states and then shift or translate one laterally sideways with respect to the other. As is shown in FIG. 3, unpolarized light is incident upon a PBS 36a, for example a Moxtek Proflux™ wire grid polarizer with S-polarization being reflected and Polarization being transmitted. The P-polarized light is then reflected off a mirror 36b at the back of the translator 36 through the PBS. The separation of the mirror 36b from the PBS of translator 36 causes the P-polarized light to be shifted sideways relative to the S-polarized light. This separation needs to be controlled precisely as will be shown later.

Figure 4A:
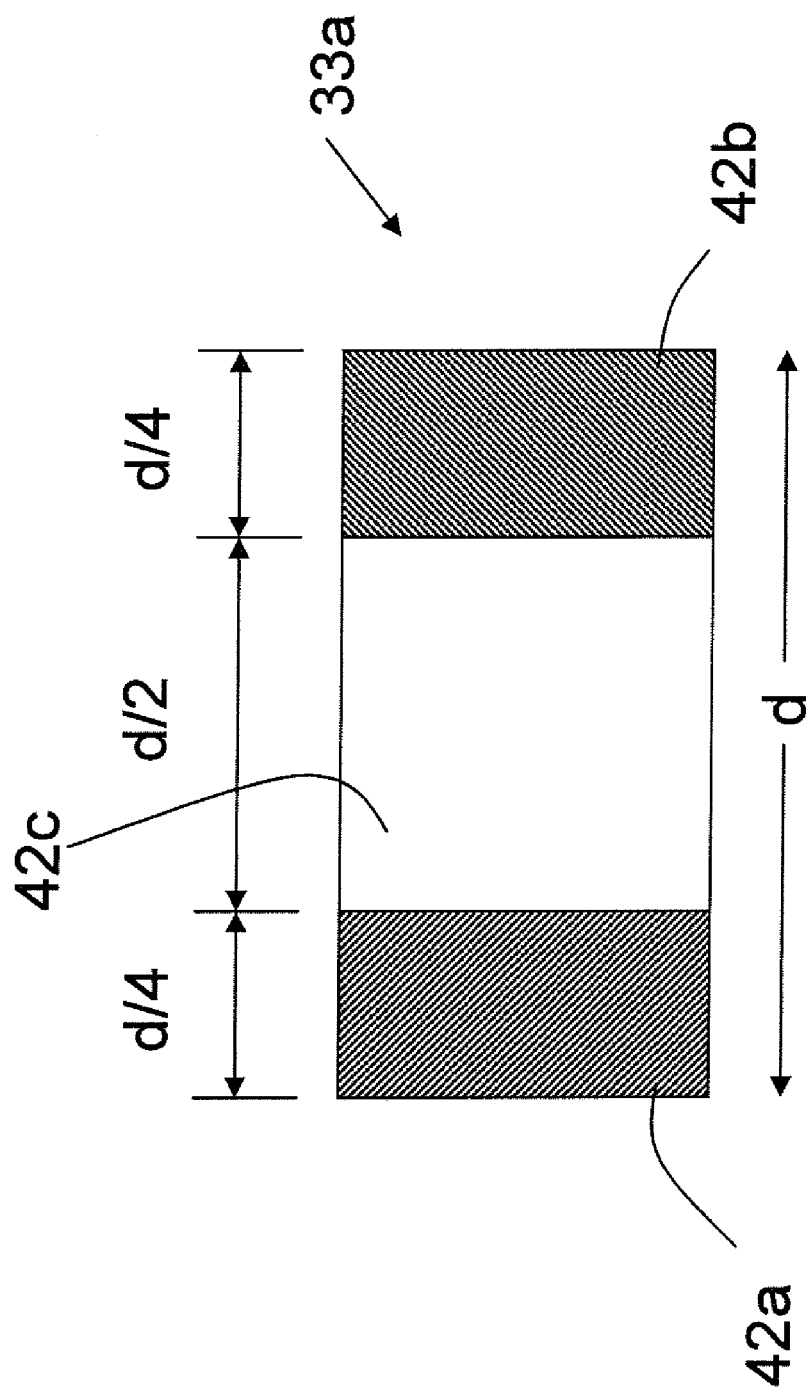
FIG. 4a is a diagram illustrating an input end face of a light pipe of FIG. 3.

As is shown in FIG. 4a the input end face of the light pipe has two masked opaque regions 42a and 42b and has a light transmissive window 42c, therebetween. Preferably, the width of the windowed region 42c is d/2 and the width of the masked regions are each d/4. The purpose of the masked regions is to yield an array of illuminated or light regions 45a and non-illuminated or dark 45b regions on the image plane. The light pipe receives the real image shown in FIG. 4a, and as light bounces within the light pipe a plurality of smaller virtual images are constructed, each a smaller version of the real image shown in FIG. 4a, at a virtual image plane about the input end of the light pipe. These virtual images would be captured as real images in the image plane of the PC 38. Since the light impinging upon the separator and translator 36 is substantially collimated, the same real images corresponding to and being conjugates of the virtual images would be present upon the separator and translator 36. Hence, the pattern in FIG. 4b would be imaged onto the elements 36 and 38.

Figure 4B:
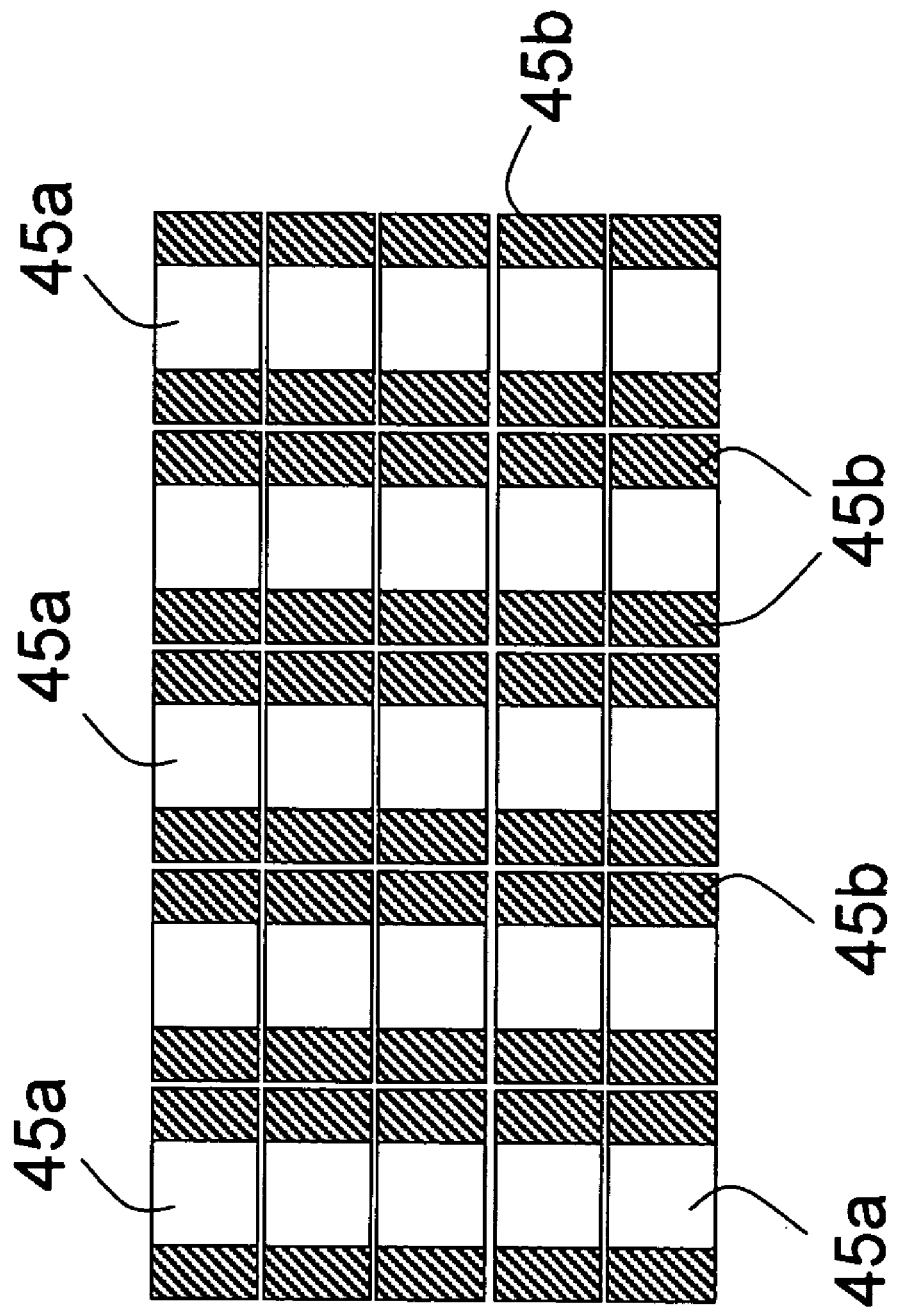
FIG. 4b is a diagram of multiple images of the light pipe input face, as would be seen at the polarization converter plane.
Figure 5:
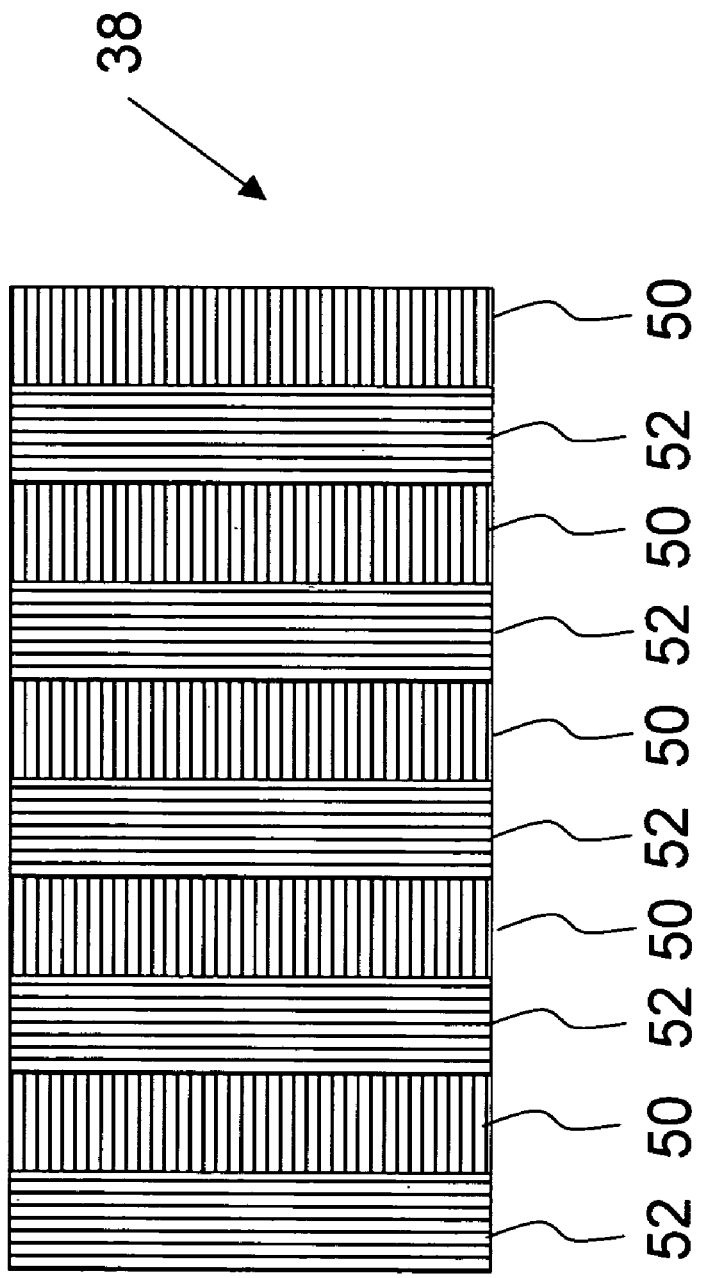
FIG. 5 is a diagram showing the S and P-polarized light stitched together side-by-side on the polarization converter plate.

However, the polarization separator and translator 36 alters the multiple real images in a predetermined manner, such that approximately half the light within illuminated regions 45a is directed to non-illuminated or dark regions 45b by way of spatial translation, so as to stitch together side-by-side S-polarized light and P-polarized light. Conveniently, the PC 38 at a plane which is conjugate to the input face 33b of the light pipe as formed by the intervening relay optics has its retarding striped regions 52 coincident with only the S or P polarized light but not both. In summary the real image shown in FIG. 4b is altered by the polarization separator and translator 36 so that light is evenly distributed in a polarization dependent manner such that the dark regions are illuminated with light of an orthogonal polarization state to the illuminated regions after polarization dependent translation and conversion occurs. If designed correctly, both the S-polarized light and the P-polarized light will appear as alternating bars of bright and dark regions. The P-polarized light will be shifted sideways relative to the S-polarized stripes such that the bright P-regions fall on top of the S-polarized dark regions with little or minimal overlap and vice versa.

In this exemplary embodiment the PC 38 is designed to transform the P-polarized light into S-polarized light. One way to perform this is to laminate strips of half wave retarder material such as plastic retarder film, quartz, mica or other birefringent materials to a transparent substrate such as glass in a pattern which matches the pattern of the of the bright regions of the P-polarized light. The retarder is designed to rotate or retard the polarization axis by 90 degrees. Light emerging from the PC 38 will then be S-polarized light. Of course S-polarized light can be transformed into P polarized light in a similar manner if desired.

Although the embodiments described heretofore have been described with respect to linearly polarized light, embodiments may be envisaged wherein circularly polarized light is used, so that all of the output light is uniformly circularly polarized. The element 36 would have to be replaced by a plate that will discriminate and translate with regard to right and left handed circularly polarized light, rather than S or P-polarized light.

Figure 6:
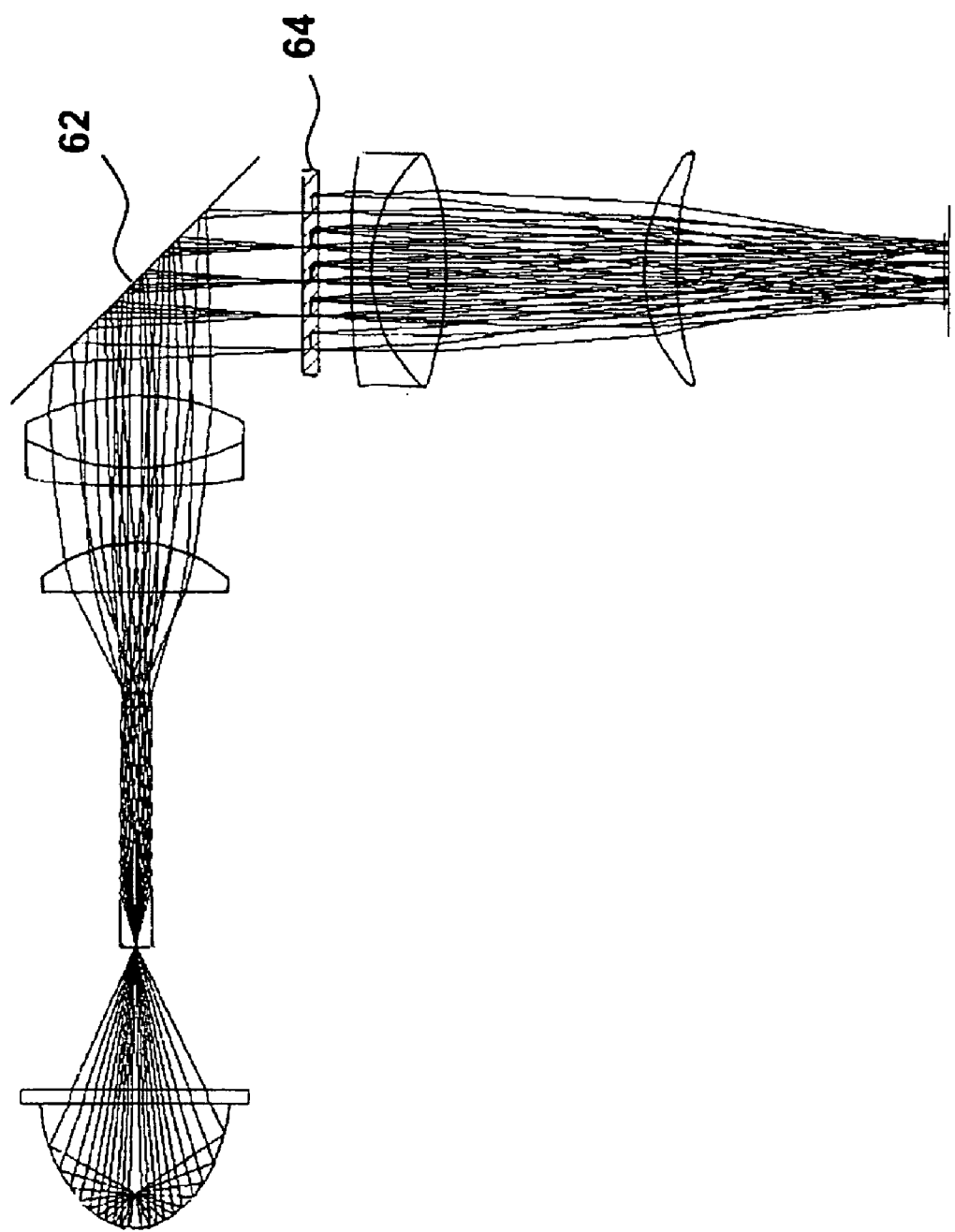
FIG. 6 is an alternative embodiment of the illumination system shown in FIG. 3.
Figure 7:
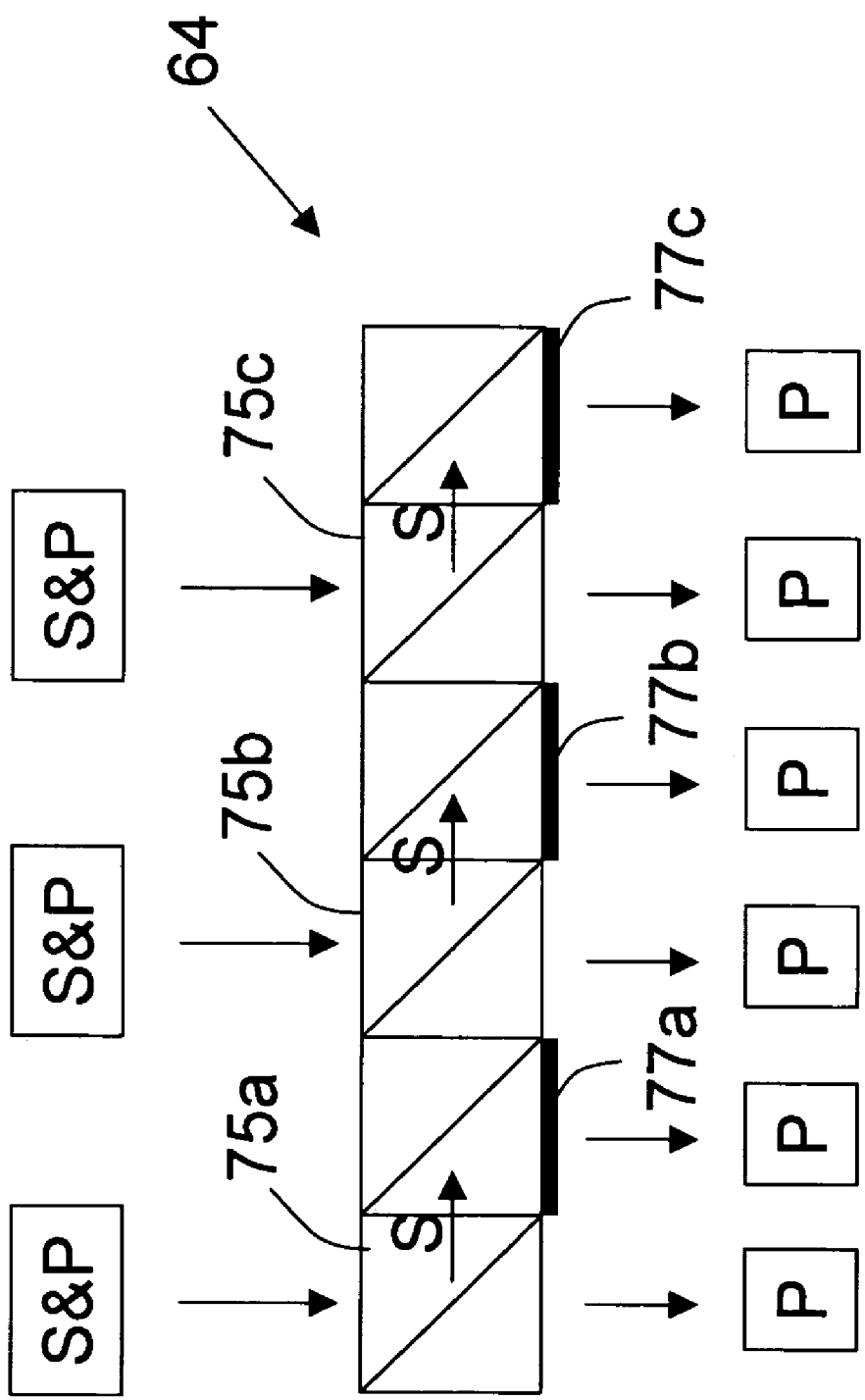
FIG. 7 is a diagram of the polarization separator and translator of the system of FIG. 6.

Turning now to FIG. 6 an alternative embodiment of the invention is shown, wherein the polarization separator and translator 36 and polarization converter 38 of FIG. 3 are replaced with an optional mirror 62 for folding light incident thereon, and for redirecting the light to a polarization separator, translator, and converter 64 shown in more detail in FIG. 7. Unpolarized light having S and P linear polarization components is incident upon an array of elements as shown. The absence of light between the arrows indicating beams of S and P-polarized light is due to the dark regions as a function of the input of the light pipe 32 or reflector being masked. The light shown by way of example, as three arrows, representing three beams is incident upon polarization beam splitters 75a, 75b, and 75c. S-polarized light is reflected while P-polarized light passes therethrough. The reflected S-polarized light reflected from 75a, 75b and 75c is then directed in a same direction as the P-polarized light and becomes P-polarized light as it passes through a retarder. Retarders 77a, 77b, and 77c provide the required retardation so that all of the output light becomes P-polarized. This embodiment of the invention also takes advantage of the plural real images which represent the masked input to provide illuminated and non-illuminated regions. In this embodiment individual beams are split and stitched, one beside the other, to fill in the dark regions; this also provides an opportunity to rotate the S-polarized light while not affecting the P-polarized light after filling in the dark regions.

In the embodiments shown in FIG. 3 and FIG. 7 the light pipe or reflector has an obstruction preventing light from entering. This appears in the plural real images directed into the collimated space as images having dark and light regions. These dark regions can subsequently be filled in with about 50% of the light present in the light regions, in a polarization dependent manner, such that the remaining light is of one linear polarization and the translated shifted light is of an orthogonal polarization. One of the two linear polarizations can conveniently be retarded or rotated to be the same as the other, thereby providing a substantially uniform beam having a same polarization state.

Of course numerous other embodiments may be envisaged without departing from the spirit and scope of the invention.

What is claimed is:

1. An illuminating system comprising:
    a) a light pipe having an input end for receiving substantially unpolarized light from a light source and an output end for outputting reflected light, the input end having a masked portion and an unmasked portion, the masked portion for substantially preventing light from entering the light pipe and the unmasked portion for allowing light to enter into the light pipe, wherein the light pipe is for reflecting light and for producing a plurality of virtual images of the input end, each virtual image having a dark non-illuminated region corresponding to the masked portion and an illuminated region corresponding to the unmasked portion adjacent to the dark non-illuminated region;
    b) a lens positioned to receive substantially unpolarized light from the output end of the light pipe for providing a plurality of real images at or about an image plane, wherein each real image corresponds to one of the virtual images such that each real image has a dark non-illuminated region corresponding to the masked portion and an illuminated region corresponding to the unmasked portion, wherein the plurality of real images together form an array of dark regions and illuminated regions; and,
    c) a polarization converting system positioned to receive substantially unpolarized light passed through the lens from the array of dark and light regions and for filling dark regions with some light from the illuminated regions in a polarization dependent manner, such that some light is spatially translated from an illuminated region to a dark region, said polarization converting system for converting light so that substantially all of the light passing therethrough is uniformly polarized.

2. An illuminating system as defined in claim 1 wherein the each real image is a conjugate of one of the virtual images and wherein the illuminating system further comprises a second lens coupled to receive polarized light from the polarization converting system and for homogenizing said light onto a target zone.

3. An illuminating system as defined in claim 2 wherein the polarization converting system includes a reflective plate for spatially separating unpolarized light incident thereon into two linear orthogonally polarization states and for reflecting said light to an optical device for converting light of one linear polarization to light of an orthogonal polarization.

4. An illuminating system as defined in claim 1, wherein the masked portion of the input end of the light pipe has consists of two masked regions on opposite sides of the input end, so as to form a light transmissive window therebetween.

5. An illuminating system as defined in claim 4, wherein the two masked regions are opaque and have a combined area substantially equivalent to the area of the light transmissive window therebetween.

6. An illuminating system as defined in claim 4, wherein the polarization converting system is adapted to fill dark regions in the real images with approximately half of light present in illuminated regions adjacent thereto in a polarization dependent manner to illuminate the dark regions.

7. An illuminating system as defined in claim 1, wherein light incident upon the polarization converting system is substantially collimated.

8. An illuminating system as defined in claim 1 wherein the polarization converting system includes a reflector for reflecting light upon an element for separating light incident thereon in a polarization dependent manner, and for retarding light of one linear polarization so as to produce a polarized output beam.

9. An illuminating system comprising:
    a) a light source;
    b) a light pipe having an end thereof masked in a predetermined manner so as to produce virtual images of the input end, each virtual image having a dark region and an illuminated region adjacent the dark region, the area of the dark region being substantially equivalent to the area of the illuminated region;
    c) a lens coupled to the light pipe to receive substantially unpolarized light therefrom for producing real images corresponding to the virtual images wherein each real image has an illuminated region and an unilluminated region;
    d) a polarization conversion system for receiving substantially unpolarized light from the lens and for filling the un-illuminated regions with light from adjacent illuminated regions in a polarization dependent manner so as to produce a substantially uniformly polarized light beam formed from the real images.

10. An illuminating system as defined in claim 9 wherein the polarization conversion system includes a plate for separating light in a polarization dependent manner such that light of a preferred polarization is spatially translated, and a plate distal therefrom for converting polarization of light translated to predetermined regions.

11. An illuminating system as defined in claim 9 wherein the polarization conversion system includes a plate for separating light in a polarization dependent manner such that light of a preferred polarization is spatially translated and light of a different polarization is reflected without being spatially translated, and a plate distal therefrom for converting the polarization of light reflected without being spatially translated.

12. In a projection display system, a method of providing a substantially uniform, homogeneous, polarized light comprising the steps of:
  providing a beam of substantially unpolarized light;
  using a light pipe having a partially masked input end, converting the un-polarized light to at least four real images each having a light region formed by substantially un-polarized light and one or more dark regions at a first image plane, said one or more dark regions having a combined area substantially equal to the area of the light regions;
  directing a portion of light from a light region in each of the real images to one or more dark regions in a polarization dependent manner; and,
  homogenizing the altered image into a single image of substantially polarized light.

13. An illuminating system as defined in claim 3 wherein the optical device for converting light of one linear polarization to light of the orthogonal polarization comprises an array of spaced polarization converting elements, each positioned to receive light of same linear polarization from one of the illuminated regions.

14. An illuminating system as defined in claim 1, wherein the light pipe is for reflecting light multiple times therewithin so as to produce the plurality of virtual images.

15. An illuminating system as defined in claim 9, wherein the light pipe is for reflecting light multiple times therewithin so as to produce a plurality of the virtual images.

* * * * *